United States Patent [19]

Kumaran

[11] Patent Number: 5,391,427
[45] Date of Patent: Feb. 21, 1995

[54] FILTER BELT
[75] Inventor: Shyam Kumaran, Victoria, Australia
[73] Assignee: Scapa Group plc, Blackburn, England
[21] Appl. No.: 934,849
[22] Filed: Aug. 25, 1992
[30] Foreign Application Priority Data Aug. 28, 1991 [AU] Australia .................. PK7993

[51] Int. Cl.$^6$ .............. B32B 7/00; B32B 25/12; D04H 1/58
[52] U.S. Cl. .................. 428/284; 428/192; 428/102; 428/286
[58] Field of Search ............ 428/192, 193, 250, 263, 428/284, 289, 492

[56] References Cited

U.S. PATENT DOCUMENTS

| | | | |
|---|---|---|---|
| 3,097,110 | 7/1963 | Danielson | 428/263 |
| 3,327,839 | 6/1967 | Sigety et al. | 198/202 |
| 3,408,249 | 10/1968 | Brown | 428/263 |
| 3,840,122 | 8/1974 | Myers | 162/DIG. I |
| 4,215,171 | 7/1980 | Marco et al. | 428/250 |

FOREIGN PATENT DOCUMENTS

| | | |
|---|---|---|
| 0791418 | 3/1958 | United Kingdom . |
| 1072402 | 6/1967 | United Kingdom . |
| 1153433 | 5/1968 | United Kingdom . |
| 1169360 | 11/1969 | United Kingdom . |
| 1392882 | 5/1975 | United Kingdom . |

*Primary Examiner*—George F. Lesmes
*Assistant Examiner*—Kathryne E. Shelborne
*Attorney, Agent, or Firm*—Keck, Mahin & Cate

[57] ABSTRACT

A filter belt (10) comprises an edge track (13) made from rubber, but having an olefin content which softens under heat to facilitate welding to a fabric. The rubber is welded to one edge of a length of fabric (12). The opposite edge of the fabric (12) is secured to a filter cloth (11).

7 Claims, 1 Drawing Sheet

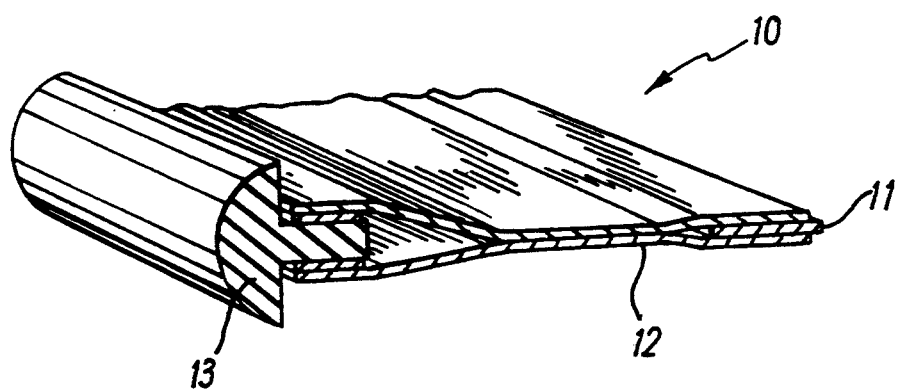

FILTER BELT

This invention relates primarily to filter belts and to a method of making filter belts.

Known drum filter belts comprise a rubber edge track which runs in guides to keep the filter cloth running perfectly straight. The rubber edge track is attached to a fabric reinforcement by means of several rows of stitching. The fabric reinforcement is also secured to the filter cloth.

The stitching connecting the rubber edge track to the fabric reinforcement tends to wear in the regions where it is prominent and the perforations made by the sewing needle are a frequent cause of failure to the rubber component. Also much time is taken in producing these filter belts.

The present invention has been made from a consideration of these problems.

According to a first aspect of the present invention there is provided a filter belt comprising at least one length of fabric and an elastomeric thermoplastic material welded to said at least one length of fabric.

According to a second aspect of the present invention there is provided a method of making a filter belt, said filter belt comprising at least one length of fabric and an elastomeric thermoplastic material, wherein said method comprises the step of heating the elastomeric thermoplastic material so as to weld the said material to said at least one length of fabric.

In a preferred embodiment of the invention the elastomeric thermoplastic material comprises rubber. The elastomeric thermoplastic material is preferably vulcanized to confer temperature stability upon the product. The material preferably has an olefin content which softens under heat so as to impart the degree of adhesion sufficient to enable the fabric to be permanently bonded to the material. SANTOPRENE (Trade Mark of Monsanto) thermoplastic elastomer material is preferred. The elastomeric thermoplastic material is preferably connected to at least one edge of the fabric so as to provide an edge track.

The fabric may comprise a filter cloth secured to a second fabric. The filter cloth may be secured to the second fabric by for example stitching or welding.

The belt of the present invention should have a longer working life than known filter belts because of the absence of stitching. What is more the time taken to assemble a belt 16 to 17 m long is reduced by about 25%. The presentation of the product is also much better than known filter belts.

Contrary to the general teaching of the art it has been found that the welding process does not degenerate the fabric and that the welded joint is sufficiently strong to support a load on the belt.

In order that the present invention may be more readily understood a specific embodiment thereof will now be described by way of example only with reference to the single accompanying drawing.

Referring to the drawing a filter belt 10, only part of which is shown, comprises a length of filter cloth 11 secured to a second reinforcement fabric by, for example stitching or welding. An edge of the reinforcement fabric 12 is welded to a SANTOPRENE (Trade Mark) thermoplastic elastomer edge track 13.

The pre-vulcanised edge track 13 is welded to the fabric 12 using a jet of hot air from a Pfaff machine. The speed of travel of the components through the machine is about 6M/min with an air temperature of between 500° to 550° C. The olefin content of the rubber edge track 13 softens under heat and adheres the edge track 13 to the fabric 12.

It is to be understood that the above described embodiment is by way of illustration only. Many modifications and variations are possible.

We claim:

1. A filter belt comprising:
   a length of filter cloth;
   an elongated track made of an elastomeric thermoplastic olefin material including which softens under heat in order to provide adhesion, said track being disposed adjacent at least one edge of said length of filter cloth; and
   at least one piece of reinforcement fabric heat welded at one edge thereof to said track and secured to said length of filter cloth so as to connect said track to said length of filter cloth and form said filter belt.

2. A filter belt as defined by claim 1, wherein said at least one piece of reinforcement fabric is secured to said length of filter cloth by stitching.

3. A filter belt as defined by claim 1, wherein said at least one piece of reinforcement fabric is secured to said length of filter cloth by welding.

4. A filter belt as defined by claim 1, wherein at least two pieces of reinforcement fabric connect said track to said length of filter cloth.

5. A filter belt as defined by claim 4, wherein said at least two pieces of reinforcement fabric overlie oppositely oriented surfaces of both said track and said length of filter cloth.

6. A filter belt as claimed in claim 1, wherein the elastomeric thermoplastic material is vulcanized.

7. A filter belt as claimed in claim 4, wherein the elongated track forms at least one edge of the filter belt.

* * * * *